United States Patent

Peterson

[11] 4,075,639
[45] Feb. 21, 1978

[54] DUAL SCANNING FOCUSING SYSTEM

[75] Inventor: Dean M. Peterson, Littleton, Colo.

[73] Assignee: Honeywell Inc., Minneapolis, Minn.

[21] Appl. No.: 728,565

[22] Filed: Oct. 1, 1976

[51] Int. Cl.² .................................................. G03B 7/08
[52] U.S. Cl. ...................................... 354/25; 250/201
[58] Field of Search .......................... 354/25, 162, 163; 352/140; 356/1, 4, 125; 250/201

[56] References Cited

U.S. PATENT DOCUMENTS

| 3,367,254 | 2/1968 | Townsley | 354/25 |
| 3,442,193 | 5/1969 | Pagel | 354/25 |
| 3,618,499 | 11/1971 | Harvey | 352/140 X |
| 3,720,148 | 3/1973 | Harvey | 354/25 |

Primary Examiner—John Gonzales
Attorney, Agent, or Firm—H. L. Hanson; C. J. Ungemach

[57] ABSTRACT

A mechanism is provided for producing a dual scan of a scene containing an object to be automatically focused upon by the image producing means of an optical system. A first mirror is caused to sweep through a scene containing the object in a first direction and then back through the scene in the opposite direction. Radiation from the scene is presented to the range determining apparatus of an automatic focusing system which produces an output signal during the scan in the opposite direction which output signal is representative of the distance to the object. The output signal is used to stop the image producing means of the optical system in the desired position for proper focus.

13 Claims, 3 Drawing Figures

DUAL SCANNING FOCUSING SYSTEM

REFERENCE TO CO-PENDING APPLICATIONS

Reference is made to a co-pending application by Dennis J. Wilwerding, Ser. No. 728,566, entitled "FOCUS CONTROL SYSTEM", which was filed on even date with this application and is assigned to the same assignee.

SUMMARY OF THE INVENTION

The present invention relates generally to apparatus for providing a measure of the distance between the apparatus and an object. More particularly, the present invention is directed towards a motion producing means that is useful in an automatic focusing system where a primary optical means, such as the taking lens of a camera, is moved to a position where an image of the object is in focus at the plane of the photographic film. Such a system is shown in the above-mentioned Dennis J. Wilwerding co-pending application. In that application, a "dual scan" automatic focus system is disclosed wherein scanning means, preferably that of the present invention, is caused to observe a scene containing an object to be focused upon by rotating a mirror in a first direction and subsequently in the opposite direction so that radiation from the scene is passed to the detection apparatus twice during one cycle of operation. The detection apparatus operates to determine the range of the object during the scan in the first direction and to produce an output signal indicative of the range during the scan in the reverse direction. The output signal is used to cause the positioning of the primary optical means for the desired focus.

The present invention includes drive means which is operably connected to position the primary optical element of an automatic focusing optical system such as a camera. The drive means includes a characterized portion, such as a cam and cam follower, connecting the drive means to a scanning means to cause the scanning means to rotate in a first and then a second, opposite direction. Radiation from the scanned scene is thus transmitted to range detecting apparatus twice during one cycle of operation. The drive means also operates to position the primary optical elements and in doing so, to minimize the inertia problems associated with the relatively massive optical element, the drive means may include a lost motion means operable to allow the drive means to move the primary optical means only during that portion of the cycle in which the scanning means is rotated in the opposite direction. Further means are provided which operate upon the receipt of an output signal from the range detecting apparatus to stop the motion of the primary optical element. Means are also included which operate after the primary optical element has been stopped in the desired position for operating other apparatus associated with the system as, for example, opening the shutter of the camera.

DETAILED DESCRIPTION OF THE PREFERRED EMBODIMENTS

Figure 1:
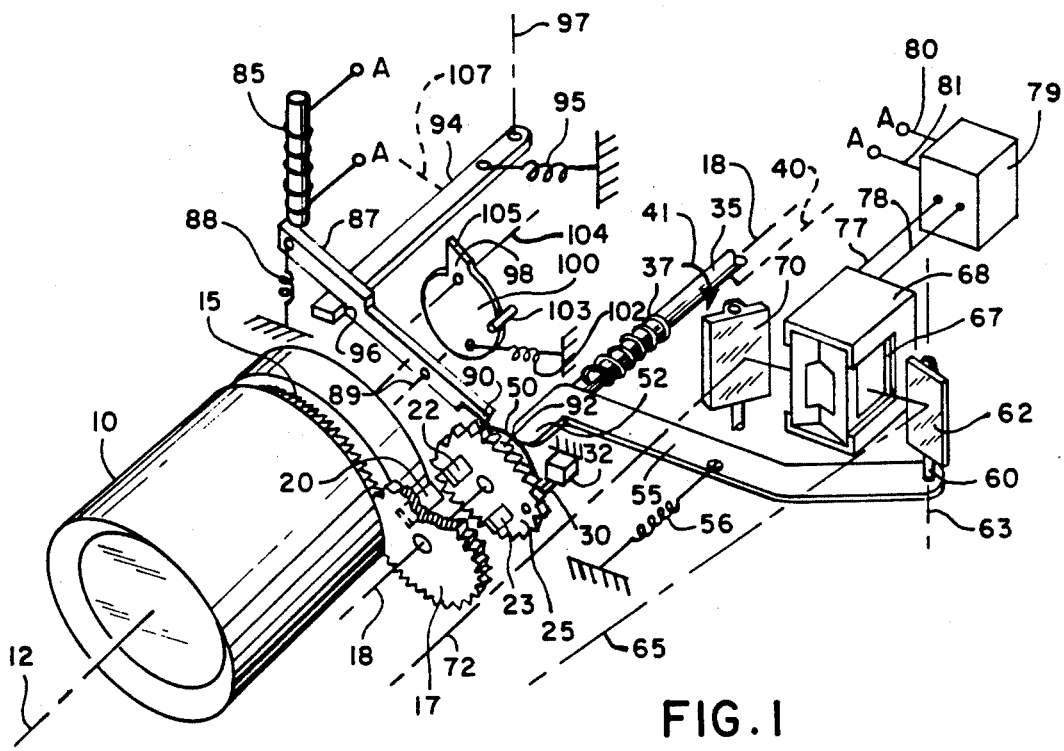
FIG. 1 is a view of a first embodiment of the present invention.

FIG. 1 shows a primary optical element 10 which may be the taking lens of a camera, mounted for motion back and forth along an axis 12 which may be the optic axis of the element 10. This motion is accomplished with the aid of gear teeth 15 on the primary optical element 10 and a gear 17 meshing with the gear teeth 15 and rotatable about an axis 18. Rotation of gear 17 rotates elements 10 and by means such as screw threads (not shown), element 10 is caused to move along axis 12.

Gear 17 has an abutment 20 mounted on the back thereof. Abutment 20 cooperates with abutments 22 and 23 on a ratchet 25 also rotatable about axis 18. Gear 17 and ratchet 25 are shown separated for purposes of clarity but in operation will be adjacent one another with abutment 20 lying in the path of abutments 22 and 23 as they move with rotation of ratchet 25. In FIG. 1 abutment 22 is positioned just above abutment 20 on gear 17 at the beginning of a cycle of operation. Abutment 23 on ratchet 25 is located at approximately 180° away from abutment 22. As ratchet 25 rotates in a clockwise direction, abutment 22 moves further away from abutment 20 and no rotation of gear 17 initially results. Further clockwise rotation of ratchet 25 causes abutment 23 to move around to where it comes in contact with the underside of abutment 20. From this time on in the cycle of operation, abutment 23 pushed on abutment 20 so that further clockwise rotation of ratchet 25 causes rotation of gear 17 and thus motion of primary optical element 10 along axis 12. Abutments 20, 22 and 23 provide a lost motion device to rotate gear 17 only on the last half cycle of the rotation of ratchet 25. A pin 30 mounted on the far side of ratchet 25 initially lies just under a fixed stop member 32. At the end of the cycle which in FIG. 1 is shown to be a little less than 360° of rotation of ratchet 25, pin 30 comes in contact with the upper side of stop member 32 and further rotation of ratchet 25 is prevented. for rotation in a clockwise direction about axis 18 by a clockspring 37. Shaft 35 may be connected to the usual picture taking lever and film advance mechanism of a camera (not shown) by means of a connection shown as dashed line 40. By activation of the camera picture taking lever, shaft 35 is released and able to rotate in a clockwise direction as shown by arrow 41 under the bias action of clockspring 37. At the end of the cycle when pin 30 on ratchet wheel 25 contacts the stop member 32, no further rotation of shaft 35 occurs. Subsequently, when the operator actuates the film advancement mechanism, shaft 35 is caused to rotate in a counterclockwise direction which moves ratchet wheel 25 and abutments 22 and 23 in a counterclockwise direction. Abutment 23 thus moves away from abutment 20 on gear 17 for the first half of the counterclockwise rotation until abutment 22 comes in contact with abutment 20. Thereafter, abutment 22 pushes abutment 20 to rotate gear 17 and return the primary optical element along axis 12 until the latching arrangement on the picture taking lever holds shaft 35. The apparatus is then restored to its initial position shown in FIG. 1.

A face cam 50 is also mounted on shaft 35 at the back of ratchet 25 and a cam follower 52 is shown in FIG. 1 bearing against the face of cam 50. Cam 50 is characterized so that cam follower 52 moves closer to ratchet 25 during the first half cycle of clockwise rotation of shaft 35 and then moves back away from ratchet 25 during the second half cycle of clockwise rotation of shaft 35. Cam follower 52 is connected to an arm 55 which is biased by a spring 56 to urge cam follower 52 to engagement with cam 50. Arm 52 is shown connected to a shaft 60 which carries a mirror 62 for rotation about an axis 63. As cam follower 52 moves closer to ratchet 25 during the first half cycle of rotation of shaft 35, mirror 62 rotates in a counterclockwise direction as viewed from above. Similarly, during the second half cycle of rotation of shaft 35 as cam follower 52 moves away from ratchet 25, mirror 62 rotates in a clockwise direction around axis 63. Thus, mirror 62 is caused to first rotate counterclockwise and then rotate clockwise during one cycle of rotation of shaft 35. Mirror 62 comprises part of the scanning system for the range detection equipment. Radiation from the scene being scanned passes in a first direction along a line shown in FIG. 1 as broken line 65 to mirror 62 and is reflected into a window 67 in a range detecting module 68. A fixed mirror 70 receives radiation from the scene being scanned in a second direction along a line shown by broken line 72 which is shown in FIG. 1 to be generally parallel to the optic axis 12 of primary optical element 10. Radiation travelling in this direction strikes mirror 70 and passes through a window similar to window 67 but on the other side of module 68. Electrical signals indicative of the images received from mirrors 62 and 70 are generated within the module 68 and are passed by lines 77 and 78 to electronic circuitry explained in detail in the above-mentioned Dennis J. Wilwerding co-pending application and shown in FIG. 1 as box 79. The electronic circuitry in box 79 produces an output signal, indicative of the range of the object to be focused by the primary optical element 10, on lines 80 and 81 during the last half cycle of shaft 35 when it is driving primary optical element 10. Lines 80 and 81 are shown connected to terminals A—A which correspond to similar terminals A—A shown in the upper left hand portion of FIG. 1 connected to a solenoid 85. Thus, sometime during the second half cycle of rotation of shaft 35 a signal representing the desired range will be presented on lines 80 and 81 and will cause the energization of solenoid 85.

Energization of solenoid 85 causes the left end of a member 87, which has heretofore been biased downwardly by a spring 88, to be moved upwardly and thus rotates member 87 about an axis 89. Rotation of member 87 about axis 89 causes a latching tooth or pawl 90 on the right end of member 87 to move downwardly into engagement with one of a set of teeth 92 on ratchet 25. This engagement locks ratchet 25 against further rotation and, accordingly, gear 17 stops turning and the motion of primary optical element 10 along axis 12 ceases. Since solenoid 85 was operated by a signal indicative of desired range, primary optical element 10 stops at a position which provides the desired focus of an image of the object on the plane of the film of the camera.

As the left end of lever 87 is pulled upwardly by solenoid 85, an arm 94, which is biased to the right in FIG. 1 by a spring 95, escapes an abutment 96 on arm 87 and is thereafter released for rotation around an axis 97 in a counterclockwise direction as viewed from above. This rotation causes arm 94 to stroke an abutment 98 on a camera shutter 100. Camera shutter 100 is biased against rotation by a spring 102 and is normally held by a pin 103 in a position which blocks the passage of radiation to the film. However, when arm 94 strikes abutment 98, the bias of spring 102 is overcome and shutter 100 rotates in a clockwise direction around axis 104. This allows radiation passing through primary optical element 10 to reach the film in the camera and produce an exposure. Arm 94 thereafter passes completely over the abutment 98 on shutter 100, after which spring 102 again closes shutter 100 to end the exposure. When the operator activates the film advance mechanism, arm 94 will be caused to return to its original position by a connection shown as dashed line 107. The bevelled surface 108 on abutment 98 permits the return of arm 94 which then becomes relocked by the abutment 96 on arm 87 which is then no longer being held in an upward position by solenoid 85. Thus, the apparatus returns to the FIG. 1 position.

In summary, to begin operation of the apparatus of FIG. 1, the operator depresses the picture taking lever which releases shaft 35 for rotation in a clockwise direction under the action of spring 37. During the first half cycle of this rotation, ratchet 50 turns without any accompanying rotation of gear 17 so that lens 10 remains in its initial position. Likewise, during the first half cycle of rotation of shaft 35, cam follower 52 in cooperation with cam 50 causes mirror 62 to sweep from the position shown in FIG. 1 counterclockwise around axis 63 to a position where the direction shown as broken line 65 would become approximately parallel to the direction shown by broken line 72. During the second half of the cycle of rotation of shaft 35, abutment 23 contacts abutment 20 so that gear 17 begins to turn, thereby moving optical element 10 along axis 12. Likewise, during the second half cycle, mirror 62 is driven back towards its initial position shown in FIG. 1. Somewhere during this second half cycle, an output signal from the electronics shown as box 79 appears on lines 80 and 81 indicating that the directions 65 and 72 are crossing at approximately the position occupied by the object to be focused. This range indicative signal causes solenoid 85 to rotate arm 87 and bring pawl 90 into engagement with one of the teeth 92 on ratchet 25. This stops motion of gear 17 and primary optical element 10 in the desired focus position. This also releases arm 94 which now moves over to strike abutment 98 on shutter 100 to allow the now properly focused image to expose the film.

After the picture has been taken, the signal from electronics box 79 disappears thus inactivating solenoid 85 and allowing spring 88 to pull arm 87 downwardly and moving pawl 90 out of engagement with ratchet 25. Shaft 35, ratchet 25 and gear 17 may then rotate until pin 30 contacts stop member 32 and further motion ceases. Later when the operator moves the film advance mechanism, shaft 35 is rotated in a counterclockwise direction until the latching mechanism associated with the picture taking lever locks shaft 35 against further clockwise rotation and arm 94 is rotated back until it reengages the abutment 96 on arm 87. At this time all of the elements shown in FIG. 1 are again returned to their initial position.

Figure 2:
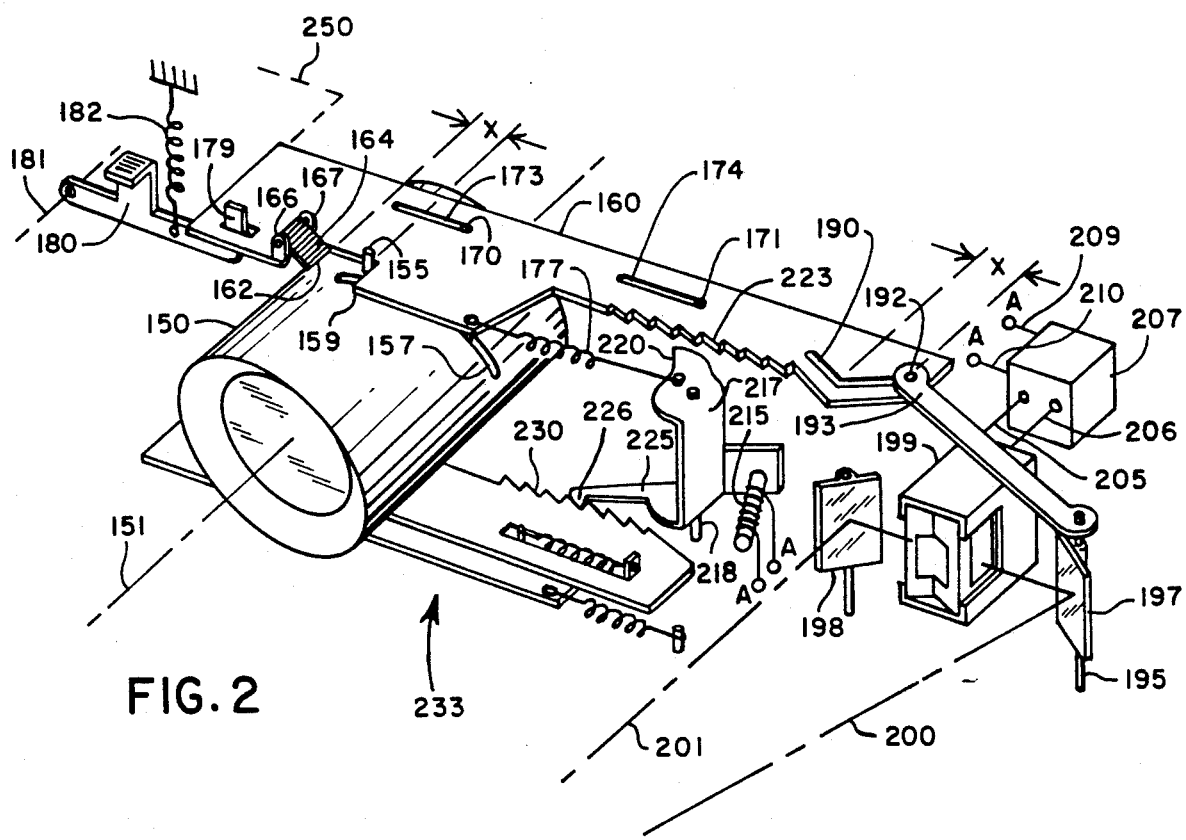
FIG. 2 is a view of a second embodiment of the present invention.

FIG. 2 shows an alternate embodiment of the present invention which operates in a linear rather than a rotary mode. In FIG. 2 the primary optical element or taking lens 150 is movable back and forth along an axis 151. Movement of primary optical element 150 is produced by the movement of a pin 155 which is constrained for motion in a groove 157 on element 150. Pin 155 is pushed towards the left by an abutment 159 in a lateral member 160 and is pushed to the right by an abutment 162 on a member 164 rotatably carried between two upright flanges 166 and 167 on member 160. Abutment 162 is displaced from abutment 159 by a distance identified in FIG. 2 as "X" so that motion of lateral member 160 to the right will not produce motion of pin 155 in groove 157 until the distance "X" has been traversed. This constitutes the lost motion apparatus of the embodiment of FIG. 2 as will be further explained.

Lateral member 160 is constrained to linear motion by pins 170 and 171 travelling in grooves 173 and 174, respectively. Lateral member 160 is biased to the right in FIG. 2 by a spring 177 but is normally held from such motion by a latch pin 179 carried on a picture taking lever 180 rotatable about an axis 181 and biased upwardly by a spring 182.

At the right end of lateral member 160, a "V" shaped or characterized groove 190 has been formed in which a pin 192 carried on an arm 193 rides. The lateral distance between the end of groove 190 and the center portion or apex of the "V" in groove 190 is set to be the distance "X" for purposes to be later explained.

Arm 193 is connected to a shaft 195 which carries a mirror 197 that cooperates with a fixed mirror 198 and a module 199 in the same manner as mirror 62, mirror 70 and module 68 of FIG. 1. As with FIG. 1, radiation from a scene being viewed travels to mirrors 197 and 198 via directions shown as broken lines 200 and 201, respectively.

The output from module 199 is presented on lines 205 and 206 to electronic apparatus shown as box 207 and, as explained with respect to FIG. 1, electronics box 207 operates to produce a signal on lines 209 and 210 indicative of the range to the object to be focused. Lines 209 and 210 are connected by terminals A—A to similar terminals A—A in the center of the drawing connected to a solenoid 215. A signal from box 207 energizes solenoid 215 which causes rotation of a member 217 around a shaft 218 in a clockwise direction as viewed from above against the bias produced by the spring 177. Member 217 carries a tooth or pawl 220 which, when solenoid 215 is energized, engages one of the ratchet teeth 223 cut into the lateral member 160 and prevents further linear motion of member 160 to the right. Member 217 also carries an arm 225 having a tooth or pawl 226 normally engaging one of the ratchet teeth 230 on a shutter mechanism shown generally as 233. Shutter mechanism 233 may be like the shutter mechanism shown in U.S. Pat. No. 3,298,859 assigned to the assignee of the present application and will not be further described here.

After picture taking lever 180 is depressed thus releasing the lateral member 160, member 160 moves under the bias of spring 177 to the right. This causes pin 192 to move within groove 190 and thus causes rotation of mirror 197 in a counterclockwise direction as viewed from above. This motion continues for the first half cycle of operation until pin 192 has reached the apex or point of the "V" shaped groove 190, at which time the directions 200 and 201 are approximately parallel. Lateral member 160 at this time has moved the distance "X" and the abutment 162 on member 164 just starts to engage pin 155 associated with the primary optical element 150. During the second half cycle of operation, member 160 continues its motion to the right, but now abutment 162 moves pin 155 causing primary optical element 150 to travel along axis 151. Also during the second half cycle, pin 192 follows in groove 190 so as to reverse the rotation of mirror 197 and to bring it back toward the position that is shown in FIG. 2. This motion continues until pin 192 engages the left end of groove 190 or until the electronics in box 207 produces a signal on lines 209 and 210 indicating that the desired focus position has been reached, at which time solenoid 215 pulls member 217 in a clockwise direction and pawl 220 engages one of the teeth 223 on lateral member 160. This action stops the motion of member 160 and causes pin 155 to stop in groove 157 thus bringing primary optical element 150 to a halt at the desired position.

As pawl 220 engages one of the teeth 223 on lateral member 160, the pawl 226 on arm 225 of member 217 disengages itself from one of the teeth 230 on shutter mechanism 233, which causes the camera shutter to open behind the now correctly positioned primary optical element 150, thereby exposing the film of the camera to the properly focused image.

After the picture has been exposed, the solenoid is deenergized thus disengaging pawl 220 from one of the teeth 223 and member 160 may continue its motion to the right until pin 192 reaches the left end of groove 190 and further motion ceases. Deenergization of solenoid 215 also brings pawl 226 into engagement with one of the teeth 230 on shutter mechanism 233. When the operator activates the usual film advance mechanism by a connection shown in FIG. 2 as a dashed line 250, he produces motion of lateral member 160 to the left in FIG. 2. Motion of lateral member 160 to the left beyond the distance "X" causes abutment 159 to engage pin 155 and move it within slot 157 to bring the primary optical element 150 back to its original starting position. The motion of member 160 to the left continues until pin 192 is at the right hand side of groove 190 again and abutment 179 on picture taking lever 180 engages the lateral element 160 to prevent further motion. Operation of the film advance mechanism also resets shutter mechanism 233 so that all of the elements are again as they are shown in FIG. 2 ready for the next picture taking sequence.

Figure 3:
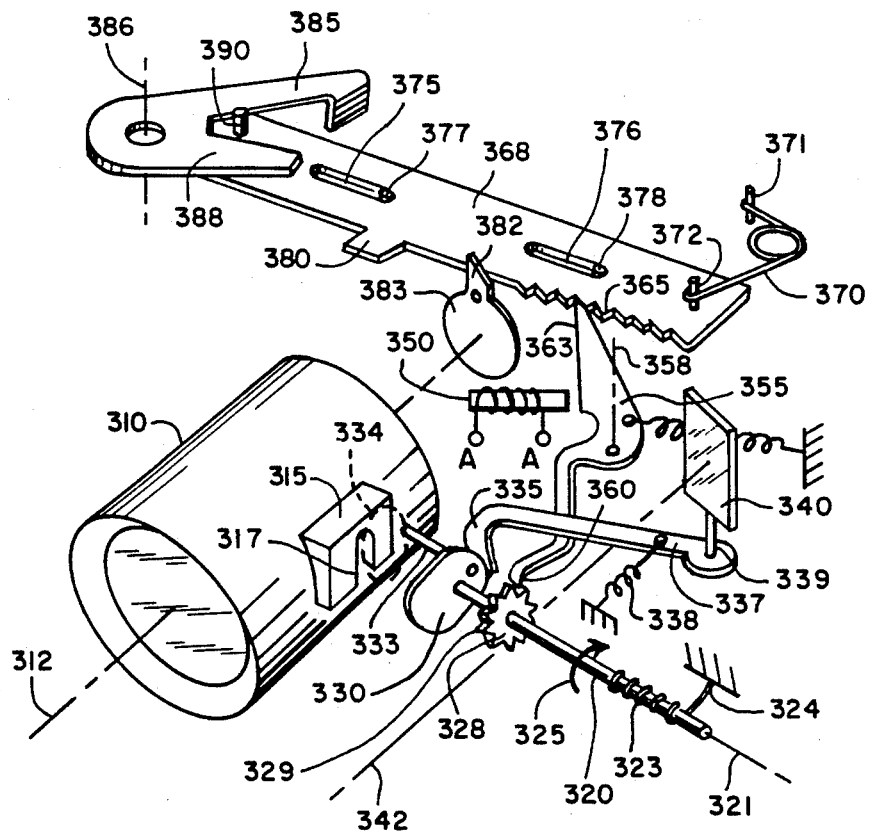
FIG. 3 is a view of a third embodiment of the present invention.

FIG. 3 shows another alternate embodiment of the present invention which operates in a rotary and linear manner. In FIG. 3, a primary optical element 310 which may be the taking lens of a camera is mounted for movement back and forth along an axis 312 which may be the optic axis of the element 310. Element 310 has a protruding portion or member 315 into which has been cut a vertical or "I" shaped groove 317. A shaft 320 is shown for rotation about an axis 321 under the bias of a clockspring 323 having one end connected to shaft 320 and the other connected to a fixed reference as at 324. Shaft 320 is normally held in a latched position by means (not shown) which may be the picture taking lever of the camera. Activation of such picture taking lever releases shaft 320 and allows bias spring 323 to rotate shaft 320 around axis 321 in the direction of arrow 325. Means (not shown) such as the pin and stop arrangement of FIG. 1 are also provided to prevent shaft 320 from rotating more than approximately one full turn.

A ratchet wheel 328 having teeth 329 and a cam 330 are shown mounted on shaft 320 for rotation therewith. A pin 333 is attached to cam 330 and extends generally parallel to axis 321 but is offset therefrom. As pin 333 rotates with shaft 320 the remote end thereof describes a circle shown by dotted line 334. About half way through one cycle of operation, the remote end of pin 333 begins to enter into the "I" shaped groove 317 in member 315. Further rotation thereafter causes the pin 333 to push against the sides of groove 317 with the result that element 310 is moved back along axis 312 until the cycle is complete or the shaft 320 is stopped. Means, (not shown) such as the pin and slot arrangement of FIG. 2 are provided to constrain element 310 for the desired linear motion along axis 312. The arrangement of the rotatable pin 333 and the "I" shaped groove 317 constitute the lost motion and the lens drive mechanism for the embodiment of FIG. 3.

The cam 330 cooperates with a cam follower 335 which acts through an arm 337 biased by a spring 338 to turn a shaft 339 connected to a mirror 340. It is seen that the shape of the cam 330 causes mirror 340 to rotate clockwise, as viewed from above, during the first half cycle of rotation of shaft 320 and then counterclockwise during the second half cycle of rotation. Mirror 340 is shown receiving radiation from the field of view in FIG. 3 along a line shown as broken line 342. The direction of broken line 342 is approximately parallel to the axis 312 which is opposite to the arrangement found in FIGS. 1 and 2. In FIGS. 1 and 2, the scan was from near-to-far and back to near, whereas in FIG. 3, the scan is from far-to-near and back to far. Both arrangements are quite satisfactory but in many cases the arrangement of FIG. 3 is preferable since if no signal is presented by the range determining means, the apparatus will come to a halt at the end of a full cycle and will be focused at a far away object rather than at a near object. For most picture taking operations, it is more likely that a condition which produces no range indicative signal will be one where a focus at infinity is preferable. The arrangement of FIG. 3, of course, requires that the primary optical element 310 be moved opposite to the arrangement shown in FIGS. 1 and 2, that is, to start, at the beginning of the second half cycle, from a position where it is focusing on objects close at hand and as the second half of the cycle of operation causes motion of the primary optical element 310 along axis 312 to be toward a position where objects at infinity are focused in the plane of the film.

For simplicity in FIG. 3, the fixed mirror, the module and the electronics of FIGS. 1 and 2 have been omitted but they would be situated in FIG. 3 in substantially the same arrangement as found in FIGS. 1 and 2 with the electronics producing a signal when the desired range has been encountered. In FIG. 3, the signal from the electronics (not shown) is presented to a solenoid 350 on terminals shown by the reference numerals A—A. Energization of the solenoid 350 produces counterclockwise rotation, as viewed from above, of a member 355 about an axis 358. Member 355 has a first arm or pawl 360 which is shown in FIG. 3 to be behind the ratchet 328 and out of engagement therewith. Upon energization of solenoid 350, however, the counterclockwise rotation of member 355 brings the pawl 360 into engagement with one of the teeth 329 on ratchet 328 and thus stops the rotation of shaft 320 and the movement of primary optical element 310.

Member 355 has a second arm or pawl 363 which is engaged with one of the teeth 365 formed into a sliding member 368. Member 368 is held by pawl 363 and teeth 365 against the bias of a spring 370 connected to a fixed pin 371 at one end and to a pin 372 mounted on member 368 at its other end. Member 368 is constrained to linear motion by slots 375 and 376 which cooperate with fixed pins 377 and 378, respectively. When member 355 is pulled into engagement with solenoid 350, pawl 363 rotates out of engagement with one of the teeth 365 and member 368 is allowed to move to the right in FIG. 3 under the bias of spring 370. Member 368 has an abutment portion 380 which, during the motion of member 368 to the right strikes an abutment 382 on a camera shutter 383 so as to cause exposure of the film in a manner similar to that described with respect to FIG. 1.

Also shown in FIG. 3 is a reset lever 385 which may be the film advance lever of the camera and which is rotatable about an axis 386 under the pushing action of the photographer. Lever 385 has an extension 388 which operates upon counterclockwise rotation of member 385, as viewed from above, to engage a pin 390 mounted on the member 368. Further counterclockwise rotation of lever 385 thus causes the return of member 368 to the left in FIG. 1 after the picture has been exposed. Lever 385, in addition to returning member 368 to its starting position, and advancing the film of the camera, may also be connected by means not shown to shaft 320 to cause it to rotate oppositely to arrow 325 and to reset the drive mechanism of FIG. 3. A latching arrangement such as the picture taking lever of the camera (not shown) would be employed similar to that arrangement shown in FIG. 2 to prevent motion of the various elements after the operator has reset the equipment and advanced the film with lever 385.

It is thus seen that I have provided apparatus for causing the desired oscillation of the scanning means and for positioning the primary optical means to a desired focus position for use in a dual scan automatic focus system.

Many modifications and alterations will occur to those skilled in the art. For example, while I have shown in FIGS. 1 and 2 that the mirrors 62 and 197 start from a position where the directions 65 and 200 intersect the directions 72 and 201 at a point near the apparatus and subsequently move in a direction during the first portion of their cycle to where the directions are parallel, as discussed in connection with FIG. 3, in many cases it would be preferable to start the mirrors 62 and 197 pointing at infinity and then rotating them during the first portion of the cycle to the position shown in FIGS. 1 and 2 and finally back toward the infinity position during the second portion of the cycle. To accomplish this would merely require a 90° rotation of face cam 50 on shaft 35 of FIG. 1 or an inversion of "V" shaped groove 190 in FIG. 2. Likewise, while I have shown latching means in the form of ratchet teeth and pawls, other motion stopping means could be employed. Similarly, while I have shown several alternate ways of providing for lost motion between the drive mechanism and the lens movimg mechanism, it is clear that other lost motion means could be employed or none at all if the inertia of the lens and the driving thereof is not a significant problem.

Accordingly, I do not wish to be limited to the specific embodiments shown in the disclosures relating to the preferred embodiments but intend only to be limited by the following appended claims.

I claim:

1. Apparatus for use with a system which includes scanning means to receive and transmit radiation from a scene containing an object, radiation responsive means to receive radiation from the scanning means and to produce an output signal indicative of the distance to the object and a member to be positioned in accordance with the output signal comprising:

drive means movable through a range of positions;

movable means connecting said drive means to said scanning means, said drive means operable to cause said scanning means to provide first and second scans of the scene during one movement of the drive means through the range;

Positioning means connecting said drive means to the member, said drive means operable to move the member; and signal responsive means connected to the radiation responsive means to receive the output signal and operable in accordance therewith to stop the movement of the member only during the second scan provided by the scanning means.

2. Apparatus in accordance with claim 1 wherein the member comprises lens means to be positioned so as to produce a focused image of the object.

3. Apparatus in accordance with claim 2 wherein the scanning means comprises rotatable radiation reflective means.

4. Apparatus in accordance with claim 3 wherein the movable means comprises a cam and cam follower, the cam being characterized so as to rotate said reflective means in first and opposite directions to provide the first and second scan respectively.

5. Apparatus in accordance with claim 4 wherein the positioning means includes lost motion means operable to cause said drive means to move said lens means only during that portion of its movement through the range corresponding to the second scan provided by the scanning means.

6. Apparatus in accordance with claim 5 and including stop means operable to prevent further movement of said drive means after said drive means has moved through the range of positions.

7. Apparatus in accordance with claim 6 wherein said drive means is spring biased and wherein latching means is provided to hold the drive means against the spring bias in an inoperable position until the latching means is released.

8. Apparatus in accordance with claim 7 wherein the lens means is the taking lens of a camera having a shutter and including means connected to said signal responsive means operable to open the shutter when the movement of the taking lens has stopped.

9. Apparatus in accordance with claim 8 wherein said drive means comprises a rotatable shaft having a ratchet wheel thereon and wherein said signal responsive means includes a latching member movable in response to the output signal to engage the ratchet wheel to stop said drive means.

10. Apparatus in accordance with claim 9 wherein said drive means includes a gear connected to said lens and operable to move said lens, said gear being mounted adjacent the ratchet wheel and wherein said lost motion means includes a first abutment on said ratchet wheel and a second abutment on said gear, the second abutment having a predetermined radial spacing with respect to the first abutment so that rotation of said ratchet wheel produces no motion of said gear until the ratchet wheel has rotated by an amount equal to the radial spacing at which time the first abutment engages the second abutment and the gear thereafter rotates with further rotation of the ratchet wheel.

11. Apparatus in accordance with claim 8 wherein said drive means comprises a lateral member movable in a linear direction and having a ratchet thereon and wherein the signal responsive means includes a latching member movable in response to the output signal to engage the ratchet and stop the drive means.

12. Apparatus in accordance with claim 11 wherein said lost motion means includes an abutment on said lateral member and a pin connected to the lens means for positioning said lens means, the pin having a predetermined linear spacing with respect to the abutment so that linear motion of the lateral member produces no motion of the pin until the lateral member has moved by an amount equal to the linear spacing at which time the abutment engages the pin and the pin thereafter moves with further movement of the lateral member.

13. Apparatus in accordance with claim 9 wherein said drive means includes a pin member attached to said shaft so that one end of said pin member moves in a circular path during rotation of said shaft and wherein said lost motion means includes a slot attached to said lens and having an open end and sides with the open end normally lying at a first position in the path so that the pin member does not engage the slot until the one end reaches the first position and thereafter further rotation of the shaft causes the pin member to press against the sides of the slot and thereby move the lens.

* * * * *